United States Patent
Philip et al.

(10) Patent No.: US 12,361,374 B2
(45) Date of Patent: Jul. 15, 2025

(54) SYSTEM AND METHOD FOR TRACKING INVENTORY INSIDE WAREHOUSE WITH PUT-AWAY ACCURACY USING MACHINE LEARNING MODELS

(71) Applicant: ASSERT SECURE TECH PVT. LIMITED, Mumbai (IN)

(72) Inventors: Job Varughese Philip, Mumbai (IN); Rohit Shekhar Pingulkar, Mumbai (IN); Gourav Raju Bhure, Nagpur (IN); Rajesh Jagnarayan Roy, Mumbai (IN)

(73) Assignee: ASSERT SECURE TECH PVT. LIMITED, Mumbai (IN)

( * ) Notice: Subject to any disclaimer, the term of this patent is extended or adjusted under 35 U.S.C. 154(b) by 422 days.

(21) Appl. No.: 17/989,577

(22) Filed: Nov. 17, 2022

(65) Prior Publication Data
US 2024/0104495 A1    Mar. 28, 2024

(30) Foreign Application Priority Data
Sep. 26, 2022    (IN) .............................. 202221054904

(51) Int. Cl.
*G06Q 10/087*        (2023.01)
(52) U.S. Cl.
CPC .................................. *G06Q 10/087* (2013.01)
(58) Field of Classification Search
CPC .................................................... G06Q 10/087
See application file for complete search history.

(56) References Cited

U.S. PATENT DOCUMENTS

| | | | | |
|---|---|---|---|---|
| 9,280,757 | B2* | 3/2016 | Parpia | G06Q 10/087 |
| 10,187,616 | B2* | 1/2019 | Shondel | H04N 7/185 |
| 10,796,275 | B1* | 10/2020 | Wilkins | G06Q 10/087 |
| 10,949,799 | B2* | 3/2021 | Chaubard | G06Q 10/087 |
| 11,620,613 | B2* | 4/2023 | Guhya | G06T 7/70 |
| | | | | 348/117 |

(Continued)

OTHER PUBLICATIONS

Rahmadya, Budi, et al. "A framework to determine secure distances for either drones or robots based inventory management systems." IEEE Access 8 (2020): 170153-170161. (Year: 2020).*

(Continued)

*Primary Examiner* — Nathan A Mitchell

(57) ABSTRACT

A system for tracking inventory inside a warehouse with put-away accuracy is provided. The system 100 includes unmanned aerial vehicle (UAV) 102 including image capturing device 102A, warehouse 104, inventory tracking unit 106, user device 108, cloud server 110, and network 112. The UAV 102 is configured to capture media contents of pre-defined space within the warehouse 104 using image capturing device 102A. The pre-defined space includes rack bays with unique rack bay identifier and inventory items stocked on rack bays with pallet identifier that is similar to corresponding unique rack bay identifier. The inventory tracking unit 106 determines inventory data including empty space, inventory mismatch, and inventory record by processing the media contents using machine learning models 106A-B. The inventory tracking unit 106 sends empty space alert and mismatch alert to user and transmits inventory data to cloud server 110 and user device 108 through network 112.

11 Claims, 9 Drawing Sheets

(56) References Cited

U.S. PATENT DOCUMENTS

| | | | | |
|---|---|---|---|---|
| 2008/0027834 A1* | 1/2008 | Meyer | ................. | G06Q 10/087 |
| | | | | 705/28 |
| 2008/0077511 A1* | 3/2008 | Zimmerman | ........ | G06Q 10/087 |
| | | | | 705/28 |
| 2014/0354809 A1* | 12/2014 | Shondel | ................. | H04N 7/185 |
| | | | | 348/144 |
| 2018/0033111 A1* | 2/2018 | Gubbi Lakshminarasimha | .......... | |
| | | | | G06Q 10/06 |
| 2019/0236530 A1* | 8/2019 | Cantrell | ................. | G06V 40/23 |
| 2020/0371528 A1* | 11/2020 | Howard | ............... | G06Q 10/087 |
| 2020/0380876 A1* | 12/2020 | Sachdeva | ................. | G08G 5/55 |
| 2022/0299995 A1* | 9/2022 | Ganapathi | ............ | G05D 1/0094 |
| 2022/0303445 A1* | 9/2022 | Skaff | ...................... | H04N 23/57 |
| 2023/0267400 A1* | 8/2023 | Nicotera | ................. | G06N 3/09 |
| | | | | 705/7.25 |
| 2024/0174499 A1* | 5/2024 | Ignatov | ................. | B66F 9/0755 |

OTHER PUBLICATIONS

Cho, Hyeon, et al. "2D barcode detection using images for drone-assisted inventory management." 2018 15th International Conference on Ubiquitous Robots (UR). IEEE, 2018. (Year: 2018).*

Fontaine, Jaron, et al. "Drone-mounted RFID-based rack localization for assets in warehouses using deep learning." 2021 26th IEEE International Conference on Emerging Technologies and Factory Automation (ETFA). IEEE, 2021. (Year: 2021).*

* cited by examiner

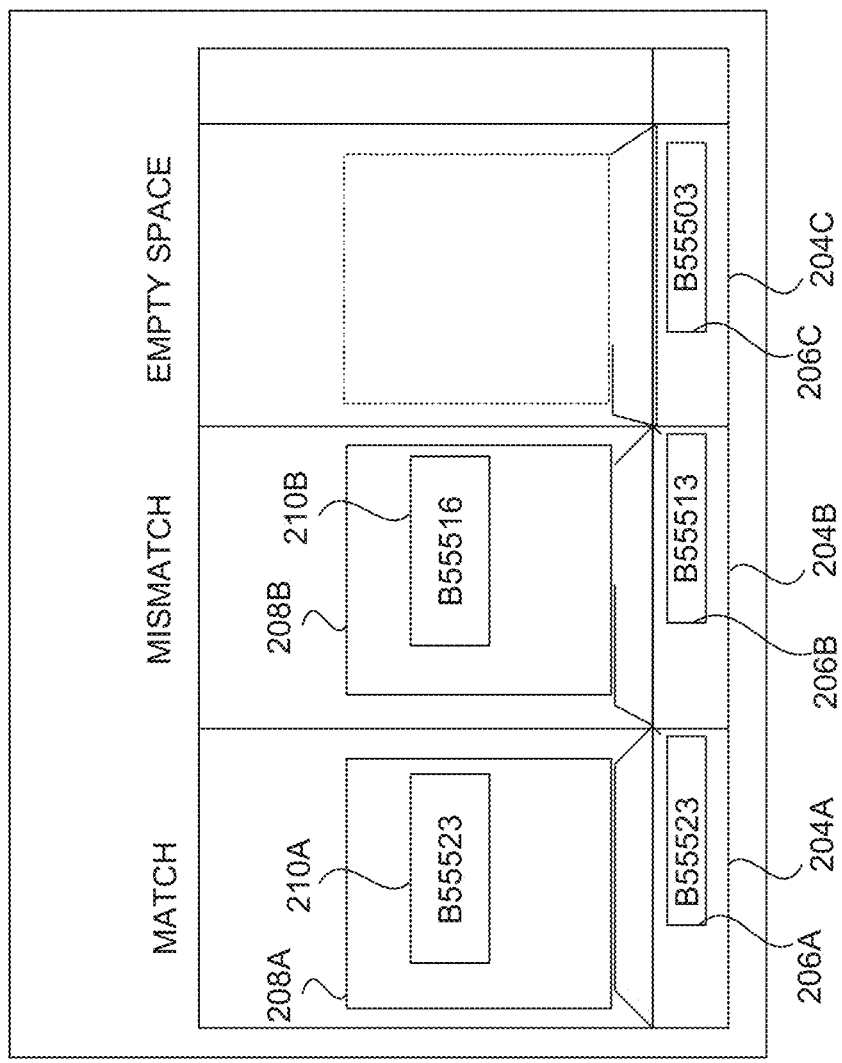

```
┌─────────────────────────────────────────────────────────────┐
│   CAPTURING, USING AN IMAGE CAPTURING DEVICE FROM AN UNMANNED│
│   AERIAL VEHICLE, ONE OR MORE MEDIA CONTENTS OF A PRE-DEFINED│
│                  SPACE WITHIN A WAREHOUSE                    │
│                             602                              │
└─────────────────────────────────────────────────────────────┘
                              │
                              ▼
┌─────────────────────────────────────────────────────────────┐
│    RECEIVING, BY A PROCESSOR OF AN INVENTORY TRACKING UNIT, THE│
│   ONE OR MORE MEDIA CONTENTS ASSOCIATED WITH THE PRE-DEFINED │
│   SPACE IN REAL-TIME FROM THE UNMANNED AERIAL VEHICLE TO     │
│   DETERMINE ONE OR MORE INVENTORY ITEMS AND ONE OR MORE RACK │
│         BAYS ASSOCIATED WITH THE PRE-DEFINED SPACE           │
│                             604                              │
└─────────────────────────────────────────────────────────────┘
                              │
                              ▼
┌─────────────────────────────────────────────────────────────┐
│   TRAINING A FIRST MACHINE LEARNING MODEL BY CORRELATING     │
│  HISTORICAL MEDIA CONTENTS WITH HISTORICAL INVENTORY ITEMS, AND│
│               THE HISTORICAL RACK BAYS                       │
│                             606                              │
└─────────────────────────────────────────────────────────────┘
                              │
                              ▼
┌─────────────────────────────────────────────────────────────┐
│   GENERATING, USING THE FIRST MACHINE LEARNING MODEL, EMPTY  │
│   SPACE DATA BY DETERMINING AN EMPTY SPACE ON THE ONE OR MORE│
│   RACK BAYS BETWEEN THE ONE OR MORE INVENTORY ITEMS WHEN THE │
│          ONE OR MORE INVENTORY ITEMS IS NOT DETECTED         │
│                             608                              │
└─────────────────────────────────────────────────────────────┘
                              │
                              ▼
┌─────────────────────────────────────────────────────────────┐
│   TRAINING A SECOND MACHINE LEARNING MODEL BY CORRELATING THE│
│   HISTORICAL INVENTORY ITEMS, AND THE HISTORICAL RACK BAYS THAT│
│   ARE ASSOCIATED WITH AT LEAST ONE IDENTIFIER WITH HISTORICAL│
│   OPTICAL CHARACTERS OF THE AT LEAST ONE IDENTIFIER IN THE   │
│                  HISTORICAL MEDIA CONTENTS                   │
│                             610                              │
└─────────────────────────────────────────────────────────────┘
                              │
                              ▼
```

FIG. 6

SYSTEM AND METHOD FOR TRACKING INVENTORY INSIDE WAREHOUSE WITH PUT-AWAY ACCURACY USING MACHINE LEARNING MODELS

CROSS-REFERENCE TO PRIOR-FILED PATENT APPLICATIONS

This application claims priority from the Indian complete application no. 202221054904 filed on Sep. 26, 2022, which is herein incorporated by reference.

BACKGROUND

Technical Field

The embodiments herein generally relate to automation of warehouse management system, and more particularly to a system and method for tracking inventory inside a warehouse using an unmanned aerial vehicle and machine learning models.

Description of the Related Art

In a warehouse, an inventory put-away refers to a process of storing/stacking goods or products (inventory) on shelves, containers, bins, pallets, and other assigned places inside the warehouse. The objective of the inventory put-away is to make warehouse operations more efficient, error-free, and fast. In other words, the inventory put-away is an essential step in the warehouse, which has greater visibility over the inventory and makes the picking process easier. It also helps the utilization of the most out of the warehouse space efficiently.

Increasing the accuracy of the inventory put away in the warehouse is the heart of the supply chain, and wrong inventory put away not only leads to loss of productivity but also, creates delays in customer orders, inventory mismatch, and operational inefficiencies.

Several existing systems track the inventory inside the warehouse in the market. However, these existing systems use a lot of manpower and spend a lot of money to ensure the tracking of inventory within the warehouse. Hence, the existing systems are operationally expensive, time-consuming, and ineffective.

Some existing systems use drones and computer vision technology to track the inventory in the warehouse. Drones are a potential solution for inventory tracking in huge warehouses. However, the existing drone-based systems are still ineffective in terms of put-away accuracy.

Accordingly, there remains a need to address the aforementioned technical drawbacks in existing systems in tracking the inventory inside the warehouse.

SUMMARY

In view of the foregoing, an embodiment herein provides a system for tracking an inventory inside a warehouse with put-away accuracy using machine learning models. The system includes an unmanned aerial vehicle (UAV) that is configured to capture one or more media contents of a pre-defined space within the warehouse when in operation, using an image capturing device. The pre-defined space includes one or more rack bays and each rack bay includes a unique rack bay identifier. Each rack bay is configured to stock one or more inventory items with a pallet identifier that is matched with the unique rack bay identifier of the corresponding rack bay. The system further includes an inventory tracking unit that is communicatively connected with the UAV and includes a memory that stores a database and a set of instructions, and a processor that executes the set of instructions from the memory. The processor is configured to: (A) receive the one or more media contents associated with the pre-defined space in real-time from the UAV to determine one or more inventory items, and one or more rack bays associated with the pre-defined space; (B) train a first machine learning model by correlating historical media contents with historical inventory items, and historical rack bays; (C) generate empty space data by determining, an empty space on the one or more rack bays between the one or more inventory items when the one or more inventory items is not detected; (D) train a second machine learning model by correlating the historical inventory items, and the historical rack bays that are associated with at least one identifier with historical optical characters of the at least one identifier in the historical media contents; (E) identify, using the second machine learning model, at least one of (i) the unique rack bay identifier associated with each rack bay, and (ii) the pallet identifier associated with the one or more inventory items by recognizing one or more optical characters from the one or more inventory items, and the one or more rack bays that are detected by the first machine learning model; (F) validate whether the pallet identifier associated with the one or more inventory items that is identified is matched with the unique rack bay identifier of the corresponding rack bay; and (G) send an empty space alert along with an empty space data, if the empty space on the one or more rack bays is determined. Thus, enabling the user to track the inventory inside the warehouse with the put-away accuracy. The put-away accuracy is a percentage of a total number of inventory items put away correctly and a total number of items put away.

In some embodiments, the UAV is pre-programmed to (i) identify the one or more rack bays, (ii) define a moving path within the warehouse to reach the location of the one or more rack bays, and (iii) move from one rack bay to another automatically based on a layout of the warehouse and coordinates of the one or more rack bays.

In some embodiments, the processor is configured to generate (i) mismatched data, when the pallet identifier is not matched with the corresponding unique rack bay identifier and (ii) matched data, when the pallet identifier is matched with the corresponding unique rack bay identifier.

In some embodiments, the processor is configured to (i) count the total number of the one or more inventory items in each rack bay to generate data on the total number of items put away, and (ii) record the inventory to generate recorded inventory details by reading an inventory identifier on the one or more inventory items using the second machine learning model.

In some embodiments, the processor is configured to send a mismatch alert along with the mismatched data, if the pallet identifier associated with the one or more inventory items is not matched with the unique rack identifier of the corresponding rack bay to a user device associated with a user.

In some embodiments, the processor is further configured to communicate the empty space data, the mismatched data, the matched data, the total number of the one or more inventory items and the recorded inventory detail to at least one of (i) a cloud server or (ii) the user device through a network.

In another aspect, a method of tracking an inventory inside a warehouse with put-away accuracy using machine learning models is provided. The method includes the steps of: (a) capturing, using an image capturing device from an unmanned aerial vehicle (UAV), one or more media contents of a pre-defined space within the warehouse. The pre-defined space includes one or more of rack bays and each rack bay includes a unique rack bay identifier. Each rack bay is configured to stock one or more inventory items with a pallet identifier that is matched with the unique rack bay identifier of the corresponding rack bay. (b) receiving, by a processor of an inventory tracking unit, the one or more media contents associated with the pre-defined space in real-time from the UAV to detect one or more inventory items, and one or more rack bays from the one or more media contents associated with the pre-defined space; (c) training a first machine learning model by correlating historical media contents with historical inventory items, and historical rack bays; (d) generating, using the first machine learning model, empty space data by determining an empty space on the one or more rack bays between the one or more inventory items when the one or more inventory items is not detected; (e) training a second machine learning model by correlating the historical inventory items, and the historical rack bays that are associated with at least one identifier with historical optical characters of the at least one identifier in the historical media contents; (f) identifying, using the second machine learning model, at least one of (i) the unique rack bay identifier associated with each rack bay, and (ii) the pallet identifier associated with the one or more inventory items by recognizing one or more optical characters from the one or more inventory items, and the one or more rack bays that are detected by the first machine learning model; (g) validating, by the processor, whether the pallet identifier associated with the one or more inventory items that is identified is matched with the unique rack bay identifier of the corresponding rack bay; and (h) sending, by the processor, an empty space alert along with the empty space data, if the empty space on the one or more rack bays is determined. Thus, the method enables the user to track the inventory inside the warehouse with the put-away accuracy. The put-away accuracy is a percentage of a total number of inventory items put away correctly and a total number of items put away.

In some embodiments, the method includes (i) counting the total number of the one or more inventory items in each rack bay to generate data on the number of inventory items, and (ii) recording the inventory to generate recorded inventory detail by the processor, when reading an inventory identifier on the one or more inventory items using the second machine learning model.

In some embodiments, the method includes communicating, by the processor, (i) the empty space data. (ii) the mismatched data that is generated, if the pallet identifier associated with the one or more inventory items is not matched, (iii) the matched data that is generated, if the pallet identifier associated with the one or more inventory items is matched, (iv) the data on the total number of one or more inventory items, and (v) the recorded inventory detail to at least one of (i) a cloud server, or (ii) the user device through a network.

In some embodiments, the UAV is pre-programmed to (i) identify the plurality of rack bays, (ii) define a moving path within the warehouse to reach a location of the plurality of rack bays, and (iii) move from one rack bay to another automatically based on a layout of the warehouse and coordinates of the plurality of rack bays.

In another aspect, there is provided one or more non-transitory computer-readable storage mediums storing the one or more sequences of instructions, which when executed by the one or more processors, causes performing a method of tracking an inventory inside a warehouse with put-away accuracy using machine learning models is provided. The method includes the steps of: (a) capturing, using an image capturing device from an unmanned aerial vehicle (UAV), one or more media contents of a pre-defined space within the warehouse. The pre-defined space includes one or more of rack bays and each rack bay includes a unique rack bay identifier. Each rack bay is configured to stock one or more inventory items with a pallet identifier that is matched with the unique rack bay identifier of the corresponding rack bay, (b) receiving, by a processor of an inventory tracking unit, the one or more media contents associated with the pre-defined space in real-time from the UAV to detect one or more inventory items, and one or more rack bays from the one or more media contents associated with the pre-defined space; (c) training a first machine learning model by correlating historical media contents with historical inventory items, and historical rack bays; (d) generating, using the first machine learning model, empty space data by determining an empty space on the one or more rack bays between the one or more inventory items when the one or more inventory items is not detected; (e) training a second machine learning model by correlating the historical inventory items, and the historical rack bays that are associated with at least one identifier with historical optical characters of the at least one identifier in the historical media contents; (f) identifying, using the second machine learning model, at least one of (i) the unique rack bay identifier associated with each rack bay, and (ii) the pallet identifier associated with the one or more inventory items by recognizing one or more optical characters from the one or more inventory items, and the one or more rack bays that are detected by the first machine learning model; (g) validating, by the processor, whether the pallet identifier associated with the one or more inventory items that is identified is matched with the unique rack bay identifier of the corresponding rack bay; and (h) sending, by the processor, an empty space alert along with the empty space data, if the empty space on the one or more rack bays is determined. Thus, the method enables the user to track the inventory inside the warehouse with the put-away accuracy. The put-away accuracy is a percentage of a total number of inventory items put away correctly and a total number of items put away.

In some embodiments, the method includes (i) counting the total number of the one or more inventory items in each rack bay to generate data on the number of inventory items, and (ii) recording the inventory to generate recorded inventory detail by the processor, when reading an inventory identifier on the one or more inventory items using the second machine learning model.

In some embodiments, the method includes communicating, by the processor, (i) the empty space data. (ii) the mismatched data that is generated, if the pallet identifier associated with the one or more inventory items is not matched, (iii) the matched data that is generated, if the pallet identifier associated with the one or more inventory items is matched, (iv) the data on the total number of one or more inventory items, and (v) the recorded inventory detail to at least one of (i) a cloud server, or (ii) the user device through a network.

In some embodiments, the UAV is pre-programmed to (i) identify the plurality of rack bays, (ii) define a moving path within the warehouse to reach a location of the plurality of rack bays, and (iii) move from one rack bay to another automatically based on a layout of the warehouse and coordinates of the plurality of rack bays.

The system of the present disclosure identifies space that is empty (vacant) on rack bays and inventory mismatch inside the warehouse in an efficient way and alerts the user about the space that is empty and mismatched for immediate action. When receiving the mismatch alerts, the user can physically remove the inventory item and put it in the right place. When receiving the empty space alerts, the user can stock further inventory items in that empty space. Thus, the system enables a real-time tracking of the inventory and improves the put-away accuracy of the inventory in the warehouse with less or no error.

As the machine learning models (the first and second machine learning models) employed by the inventory tracking unit of the present disclosure are trained with historical media contents (training dataset) that are captured at different lighting conditions, the inventory tracking unit is capable of analyzing the media contents that are taken at low resolution (i.e. low LUX levels) or IR mode. With this inventory tracking unit, the UAV can be operated under different warehouse conditions including low light, bright light, or IR mode. Cloud connectivity provided by the system stores and enables the access of inventory data from anywhere for real-time tracking of the inventory.

The system speeds up the inventory tracking process and reduces the time to monitor the inventory from a few days to a couple of hours. The system also reduces manpower with its automated tracking capability. As the manpower is reduced, the cost of the manpower maintenance is also reduced with this system. The system also reduces the economic losses due to inventory mismanagement and issues in picking as the system tracks the inventory accurately. The system further reduces the need for high internet bandwidth as the system can work on very low internet bandwidth.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2B is an exemplary view of tracking inventory using an inventory tracking unit of FIG. 1 in a pre-defined space of a warehouse according to some embodiments herein;

FIGS. 6A and 6B are flow diagrams that illustrates a method of tracking inventory inside a warehouse using machine learning models according to some embodiments herein.

DETAILED DESCRIPTION OF THE DRAWINGS

Figure 1:
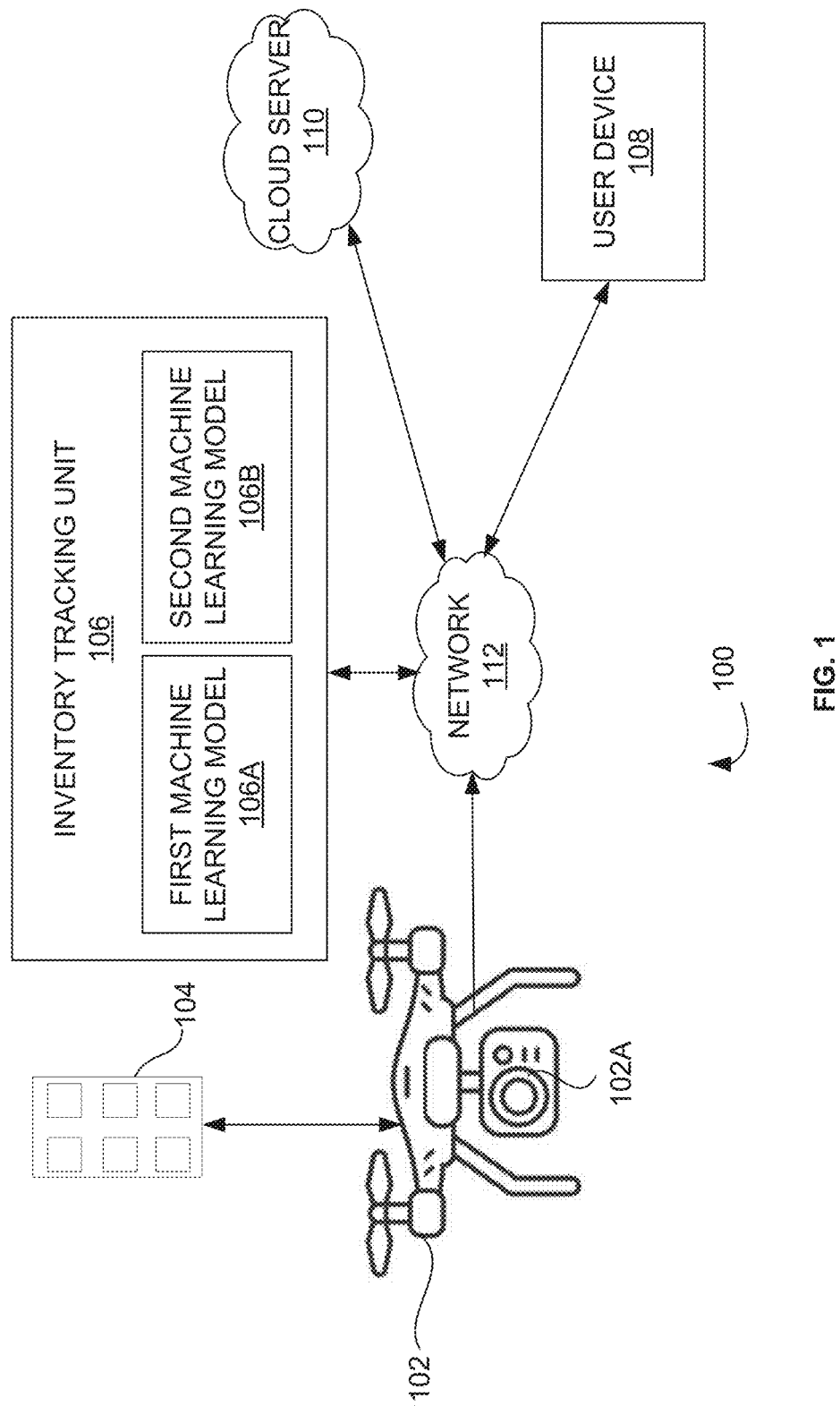
FIG. 1 illustrates a block diagram of a system for tracking inventory inside a warehouse using machine learning models according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system for tracking inventory inside a warehouse with put-away accuracy at a reduced cost, time, and manpower. Various embodiments disclosed herein provide a system and method for tracking inventory inside a warehouse with put-away accuracy using an unmanned aerial vehicle (for example, a drone) and machine learning models. Referring now to the drawings, and more particularly to FIGS. 1 through 7, where similar reference characters denote corresponding features consistently throughout the figures, preferred embodiments are shown.

FIG. 1 illustrates a block diagram of a system 100 for tracking inventory inside a warehouse 104 using machine learning models 106A, and 106B according to some embodiments herein. The system 100 includes an unmanned aerial vehicle (UAV) 102, an image capturing device 102A associated with the UAV 102, the warehouse 104, an inventory tracking unit 106, a user device 108 associated with a user, and a cloud server 110. The inventory tracking unit 106 includes a first machine learning model 106A and a second machine learning model 102B.

The unmanned aerial vehicle 102 is employed within the warehouse 104 for tracking the inventory inside the warehouse 104. The UAV 102 is configured to capture one or more media contents of a pre-defined space within the warehouse 104 using the image capturing device 102A associated with the UAV 102. The warehouse 104 may be a warehouse, a godown, a distribution center, a fulfillment center, a supply chain unit, a storage hub, or other storage or logistics facilities.

The pre-defined space includes one or more racks and each rack includes one or more rack bays. Each rack bay includes a unique rack bay identifier and is configured to stock one or more inventory items. The one or more inventory items include (i) a pallet identifier, and (ii) an inventory identifier. The pre-defined space further includes the surroundings of the one or more rack bays and the one or more inventory items. The one or more inventory items may be any warehouse items, such as, but not limited to, boxes, pallets, cartons, packages, and cases. In some embodiments, the pallet identifier in one or more inventory items is matched with the unique rack bay identifier of the corresponding rack bay. That is, the pallet identifier of the one or more inventory items stocked in the rack bay is similar to the unique rack bay identifier of the corresponding rack bay. The unique rack bay identifier or the pallet identifier may be of alpha-numeric characters, numbers, letters, text, symbols, drawings, or pictures associated with the inventory items, any recognizable features of the inventory items, or combinations thereof. The inventory identifier may be at least one of alpha-numeric characters, barcode, QR code, text, symbols, labels, images or drawings, printed characters, pictures associated with the inventory items, and the like.

The UAV 102 is operated autonomously and is preprogrammed to (i) identify the one or more racks, (ii) define a moving path within the warehouse 104 to reach the location of the one or more racks, and (iii) move from one rack bay to another. The moving path is defined based on the coordinates of the one or more racks and rack bays. A layout of the warehouse 104 and x, y coordinates of the one or more racks and rack bays may be fed to a path optimization algorithm, to generate a moving path for the UAV 102 inside the warehouse 104. In some embodiments, the UAV 102 moves from one rack bay to another rack bay according to the moving path that is generated and captures the one or more media contents associated with the pre-defined space. The moving path may be two-dimensional (2D). The UAV 102 may be operated remotely by a human operator or operated automatically. The unmanned aerial vehicle 102 may be a drone, mobile robot, autonomous car, or any other automated vehicle.

In some embodiments, the image capturing device 102A captures the one or more media contents in different lighting conditions including low light and bright light. The image capturing device 102A may capture the one or more media contents in Infrared (IR) mode. The one or more media contents may include at least one image or video of the predefined space in the warehouse 104. The image capturing device 102A may be at least one of a camera, IR camera, thermal camera, night vision camera, optical sensor, mobile phone, Smartphone, or any kind of imaging device.

The inventory tracking unit 106 is communicatively connected to the UAV 102 through a network 112. The inventory tracking unit 106 includes a memory that stores a database and a set of instructions, and a processor that executes the set of instructions from the memory. When the UAV 102 is in operation and captures the one or more media contents associated with the pre-defined space of the warehouse 104, the inventory tracking unit 106 is configured to receive the one or more media contents from the UAV 102 through the network 112 in real-time. The network 112 may be a wireless network, a wired network, a combination of a wireless network and wired network or Internet. The wireless network may be Bluetooth Low Energy (BLE), Near Field Communication (NFC), Bluetooth, WiFi and the like. The inventory tracking unit 106 may be a handheld device, a mobile phone, a kindle, a PDA (Personal Digital Assistant), a tablet, a music player, a computer, an onsite/remote server, an electronic notebook or a smartphone.

The inventory tracking unit 106 processes the one or more media contents using the first machine learning model 106A, and the second machine learning model 106B. The inventory tracking unit 106 detects the one or more rack bays and the one or more inventory items from the one or more media contents associated with the pre-defined space using the first machine learning model 106A. The inventory tracking unit 106 further determines an empty space on the one or more rack bays between the one or more inventory items when the one or more inventory items are not detected.

The inventory tracking unit 106 identifies at least one of (i) the unique rack bay identifier associated with each rack bay, and (ii) the pallet identifier associated with the one or more inventory items using the second machine learning model 106B by recognizing one or more optical characters from the one or more rack bays and the one or more inventory items that are detected by the first machine learning model 106A. The inventory tracking unit 106 validates whether the pallet identifier associated with the one or more inventory items is matched with the unique rack bay identifier of the corresponding rack bay. The inventory tracking unit 106 is configured to generate at least one of (i) an empty space data, if the empty space is determined, (ii) a matched data, when the pallet identifier is matched with the corresponding unique rack bay identifier; and (iii) a mismatched data if the pallet identifier is not matched with the corresponding unique rack bay identifier. The empty space data includes the unique rack bay identifier of the rack bay that includes vacant space and the number of vacant spaces on the particular rack bay. The mismatched data includes the unique rack bay identifier of the rack bay on which the mismatched inventory item is placed. The matched data may include a confirmation message (for example, an "OK" message) about the placement of the correct inventory item on the corresponding rack bay with identifier information.

The inventory tracking unit 106 is further configured to (i) count the number of inventory items in each rack bay to generate data on the number of inventory items, and (ii) record the inventory to generate recorded inventory details by recognizing the inventory identifier on the one or more of inventory items using the second machine learning model 106B. The recorded inventory details may include information about inventory with a note to take action for recorded things, for example, mismatched items, within a certain period of time. The inventory tracking unit 106 may read or scan the inventory identifier on the one or more inventory items to recognize the inventory identifier using the second machine learning model 106B.

The inventory tracking unit 106 generates inventory data by gathering the empty space data, the matched data, the mismatched data, the data on the number of inventory items, and the recorded inventory details.

The inventory tracking unit 106 is further configured to send at least one of (i) an empty space alert along with the empty space data, if the empty space is determined, and (ii) a mismatch alert along with the mismatched data, if the pallet identifier is not matched with the corresponding unique rack identifier to the user device 108 associated with the user through the network 112. The inventory tracking unit 106 also communicates the inventory data to the user device 108 associated with the user. The user device 108 may communicatively connect with the inventory tracking unit 106 through the network 112 and includes a program to receive alerts if any and the inventory data. The program may notify the user about the empty space alert or the mismatch alert. The program may be a client-side program. The client-side program may be a mobile or web application. The user may be a worker of the warehouse 104, administrative officer, in-charge personnel, supervisor, manager, or any executives of the warehouse 104. The user device 110 may be a hand-held device, a mobile phone, a Smartphone, a smart wearable device, a kindle, a PDA (Personal Digital Assistant), a tablet, a music player, a computer, or an electronic notebook.

The inventory tracking unit 106 is further communicatively connected with the cloud server 110 through the network 112 and communicates the inventory data to the cloud server 110. The cloud server 110 is configured to receive and store the inventory data. The cloud server 110 enables access to the inventory data from anywhere. In some embodiments, the inventory data in the cloud server 110 is displayed on a web-based dashboard. The web-based dashboard may be used to present the inventory data and indicates alerts if any in real time to any users.

Thus, inventory tracking unit 106 enables the user to track the inventory inside the warehouse 104 with the put-away accuracy.

Figure 2A:
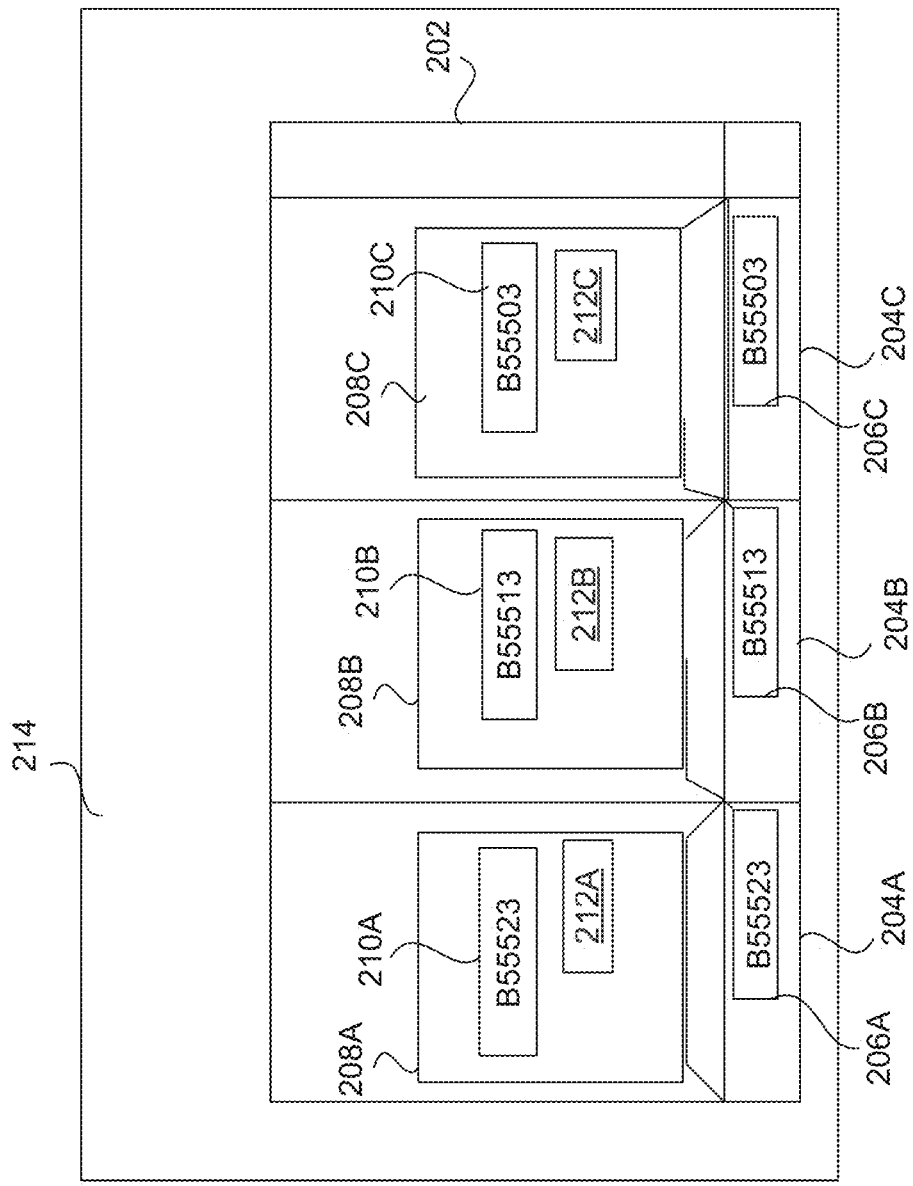
FIG. 2A is an exemplary view of a pre-defined space of a warehouse according to some embodiments herein.

FIG. 2A is an exemplary view of a pre-defined space of a warehouse 104 according to some embodiments herein. The pre-defined space includes a rack 202 that includes a first rack bay 204A with a first unique rack bay identifier 206A, for example, B55523 as shown in the figure, a second rack bay 204B with a second unique rack bay identifier 206B, for example, B55513 as shown in the figure, and a third rack bay 204C with a third unique rack bay identifier 206C, for example, B55503 as shown in the figure. The first rack bay 204A, the second rack bay 204B, and the third rack bay 204C stock a first inventory item 208A with a first pallet identifier 210A, for example, B55523 as shown in the figure, a second inventory item 208B with a second pallet identifier, for example, B55513 as shown in the figure, and a third inventory item 208C with a third pallet identifier, for example, B55503 as shown in the figure respectively.

In some embodiments, the first pallet identifier 210A on the first inventory item 208A is matched with the first unique rack bay identifier 206A of the first rack bay 204A; the second pallet identifier 210B on the second inventory item 208B is matched with the second unique rack bay identifier 206B of the second rack bay 204B, and the third pallet identifier 210C on the third inventory item 208B is matched with the third unique rack bay identifier 206B of the third rack bay 204B.

The first inventory item 208A, the second inventory item 208B, and the third inventory item 208C further include a first inventory identifier 212A, a second inventory identifier 212B, and a third inventory identifier 212C. The pre-defined space further includes surroundings 214 of (i) the first rack bay 204A, the second rack bay 204B, and the third rack bay 204C, and (ii) first inventory item 208A, the second inventory item 208B, and the third inventory item 208C.

One or more media contents (e.g. video) of the pre-defined space in the warehouse 104 are captured by an unmanned aerial vehicle (UAV) 102 and processed for inventory tracking by an inventory tracking unit 106 in real-time.

FIG. 2B is an exemplary view of tracking inventory using an inventory tracking unit 106 of FIG. 1 in a pre-defined space of a warehouse 104 according to some embodiments herein. The pre-defined space in the warehouse 104 includes a first rack bay 204A with a first unique rack bay identifier 206A, for example, B55523 as shown in the figure, a second rack bay 204B with a second unique rack bay identifier 206B, for example, B55513 as shown in the figure, and a third rack bay 204C with a third unique rack bay identifier 206C, for example, B55503 as shown in the figure.

In some exemplary embodiments, the first rack bay 204A and second rack bay 204B may stock a first inventory item 208A with a first pallet identifier 210A, for example. B55523 as shown in the figure, and a second inventory item 208B with a second pallet identifier, for example, B55516 respectively. The third rack bay 204C may be without any inventory item.

The inventory tracking unit 106 may detect (a) the first unique rack bay identifier 206A, and (b) the first inventory item 208A for detecting the first pallet identifier 210A using a first machine learning model 106A and a second machine learning model 106B and may verify whether the first pallet identifier 210A is matched with the first unique rack bay identifier 206A. The inventory tracking unit 106 generates matched data for the first rack bay 204A as the first pallet identifier 210A is matched with the first unique rack bay identifier 206A.

The inventory tracking unit 106 may detect (i) the second unique rack bay identifier 206B and (ii) the second inventory item 208B for detecting the second pallet identifier 210B using the first machine learning model 106A and the second machine learning model 106B and may verify whether the second pallet identifier 210B is matched with the second unique rack bay identifier 206B. The inventory tracking unit 106 generates mismatch alert and a mismatched data as the second pallet identifier 210B is not matched with the second unique rack bay identifier 206B.

The inventory tracking unit 106 may detect the third unique rack bay identifier 206C and determine that there is no inventory item on the third rack bay 204C (that is, detects an empty space) using the first machine learning model 106A and the second machine learning model 106B. The inventory tracking unit 106 generates an empty space alert and an empty space data as the third inventory item 208B is not detected.

Figure 3:
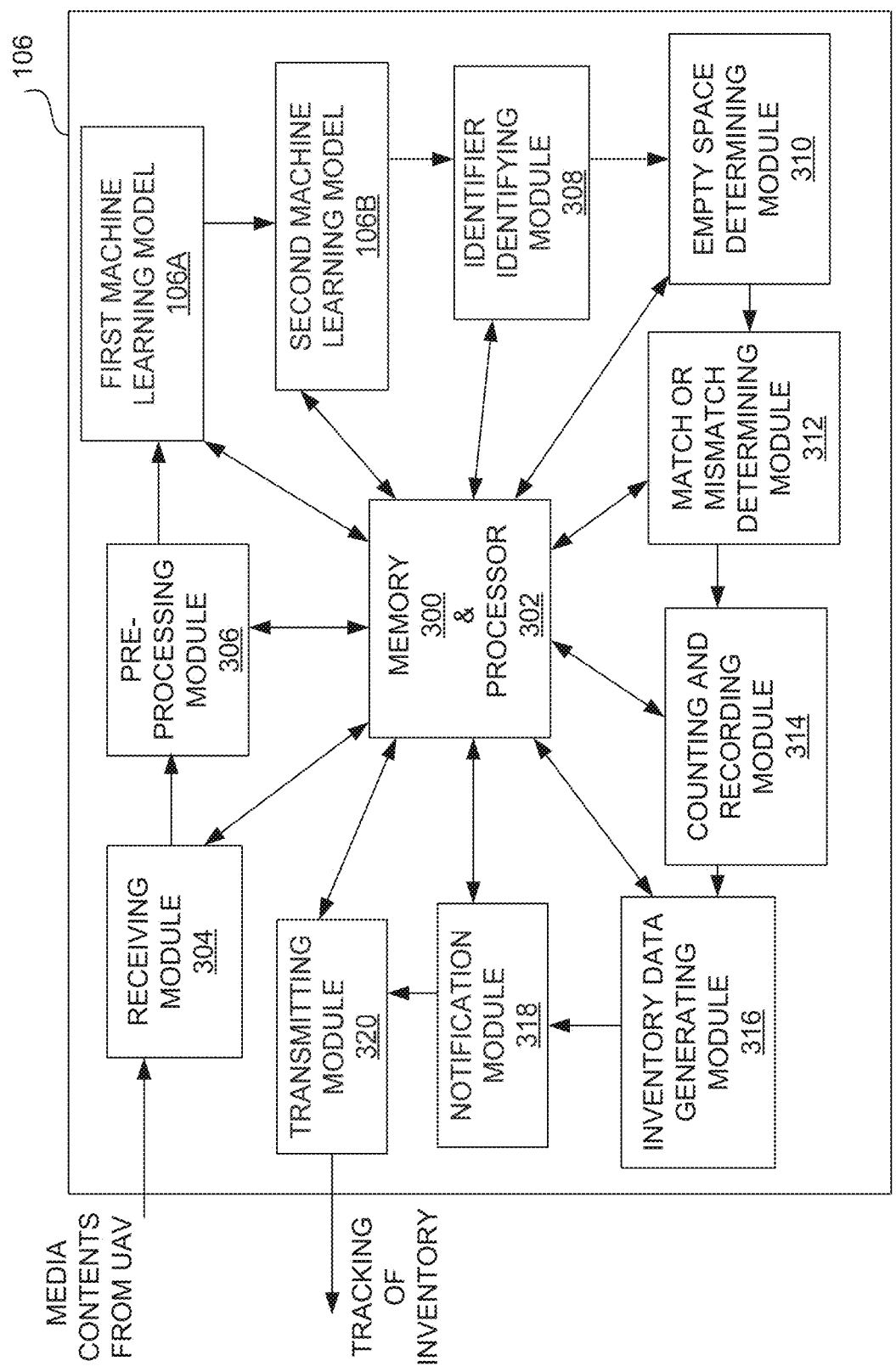
FIG. 3 is a block diagram of an inventory tracking unit of FIG. 1 according to some embodiments herein.

FIG. 3 is a block diagram of an inventory tracking unit 106 of FIG. 1 according to some embodiments herein. The inventory tracking unit 106 includes a memory 300, a processor 302, a receiving module 304, a pre-processing module 306, a first machine learning model 106A, a second machine learning model 106B, an identifier identifying module 308, an empty space determining module 310, a match or mismatch determining module 312, a counting and recording module 314, an inventory data generating module 316, a notification module 318, and a transmitting module 320.

The receiving module 304 receives one or more media contents associated with a predefined space inside a warehouse 104, that is captured using an image capturing device 102A from an unmanned aerial vehicle (UAV) 102 when the UAV is in operation, through a network 112 in real-time and stores in a database associated with the memory 300. The one or more media contents may include an image or video content of the predefined space including one or more rack bays with a unique rack bay identifier and one or more inventory items with a pallet identifier, and an inventory identifier. The predefined space further includes the surroundings of the one or more rack bays and the one or more inventory items.

The pre-processing module 306 selects one or more media contents based on at least one of (i) lighting conditions of the warehouse 104, and (ii) an angle of the UAV 102. The pre-processing module 306 may select one or more media contents with frames that are captured at a right angle and good lighting conditions by applying filters on the frames. The pre-processing module 306 further pre-processes the one or more selected media contents to obtain one or more pre-processed media contents. The pre-processing may include at least one noise removal, contrasting process, Gaussian Blur operation, convolution, and the like. The pre-processing module 306 crops a region of interest (ROI) and removes the background area of the predefined space from the one or more selected media contents. The ROI includes the one or more rack bays and one or more inventory items. The background area may be the surroundings of the one or more rack bays and the one or more inventory items in the pre-defined space of the warehouse 104. The pre-processing module 306 may use one machine learning model to pre-process the one or more selected media contents.

The identifier identifying module 308 processes the pre-processed media contents to identify the one or more inventory items, and the one or more rack bays using a first machine learning model 106A. The identifier identifying module 308 identifies the one or more inventory items, and the one or more rack bays by (i) segmenting the ROI to obtain one or more segments. (ii) extracting one or more features from the one or more segments, and (iii) providing the one or more features to the first machine learning model 106A. The first machine learning model 106A may be trained by correlating one or more historical media contents with one or more historical inventory items, and one or more historical rack bays. The one or more historical media contents are captured in at least one of the different lighting conditions comprising at least one of the low light conditions, bright light conditions, or 1R mode. The identifier identifying module 308 may read or scan the inventory identifier on the one or more inventory items to recognize the inventory identifier.

The empty space determining module 310 is configured to extend the identification of the one or more inventory items using the first machine learning model 106A, if the one or more inventory items are not detected at the identifier identifying module 308. The empty space determining module 310 may extend the identification to a pre-determined range of regions from a region that is detected with the one or more rack bays. The pre-determined range of region may be determined based on the size of the one or more inventory items. The empty space determining module 310 determines an empty space, if the one or more inventory items are not identified within the pre-determined range of the region. The empty space determining module 310 further generates an empty space data, if the empty space is determined. The empty space data includes the unique rack bay identifier of the rack bay that includes vacant or empty space and the number of vacant spaces on the particular rack bay.

The identifier identifying module 308 may crop regions of the one or more inventory items and the one or more rack bays that are identified and feed into a second machine learning model 106B. The identifier identifying module 308 recognizes one or more optical characters from the regions of the one or more inventory items, and the one or more rack bays that are detected by the first machine learning model 106A in each frame using the second machine learning model 106B to identify at least one of (i) the unique rack bay identifier associated with each rack bay, and (ii) the pallet identifier and the inventory identifier associated with the one or more inventory items. The second machine learning model 106B may be at least one of tensorflow (TF) model, torch model, paddle optical character recognition (OCR) model, easy OCR, any OCR algorithms, or a combination thereof. The one or more optical characters may include alpha-numerals, numbers, letters, text, words, symbols, drawings, pictures, or phrases. The second machine learning model 106B may use pattern recognition or feature recognition. The pattern recognition may detect arrangements of characteristics or data that yield information about the system or data set. The pattern recognition is used to automatically analyze images to gather meaningful information from them. The second machine learning model 106B may recognize the one or more optical characters by comparing the one or more characters that are detected with a note that is learned to find matches. In some embodiments, the second machine learning model 106B uses rules based on specific character properties to recognize the one or more optical characters. The specific character properties may include angled, crossing, or curved lines in characters. The second machine learning model 106B is trained by correlating the one or more historical inventory items, and the one or more historical rack bays that are associated with at least one identifier with one or more historical optical characters of the at least one identifier in one or more historical media contents. The identifier identifying module 308 may use one or more techniques to triangulate the right identifier which is identified most of the time during perfect lighting conditions. The identifier identifying module 308 may apply regular expressions (regex) on the frames with one or more optical characters to eliminate error and creates a list of acceptable characters of the particular identifier by combining the frames with recognized characters. The identifier identifying module 308 may finalize the identifier which is identified most of the time from the list of acceptable characters. In some exemplary embodiments, the identifier identifying module 308 may recognize the optical characters in ten frames as [(i) B534C, (ii) B53C, (iii) B58C, (iv) B53C, (v) B53C1, (vi) B53C, (vii) 853C, (viii) B53C, (ix) B53C, and (x) B53C]. The identifier identifying module 308 may apply the regular expression and eliminates the optical characters (v) and (vii). The identifier identifying module 308 further creates the list of acceptable optical characters as [B534C, B53C, B58C, B53C, B53C, B53C, B53C, B53C] after eliminating the optical character B53C1 and 853C. The identifier identifying module 308 may finalize B53C from the list as the identifier.

The match or mismatch determining module 312 checks whether the pallet identifier associated with the one or more inventory items is matched with the unique rack bay identifier of the corresponding rack bay. The match or mismatch determining module 312 may define a match determining region for analyzing the match or the mismatch. The match determining region may include the regions with identified identifiers (i.e. unique rack bay identifier and pallet identifier).

The match or mismatch determining module 312 further generates at least one of (i) a matched data when the pallet identifier is matched with the corresponding unique rack bay identifier; and (ii) a mismatched data if the pallet identifier is not matched with the corresponding unique rack bay identifier. The matched data may include a confirmation message about the placement of the correct inventory items on the corresponding rack bay with identifiers. The mismatched data may include the unique rack bay identifier of the rack bay on which the mismatched inventory item is placed.

The counting and recording module 314 performs counting of the number of inventory items on each rack bay to generate data on the number of inventory items, and recording the inventory to generate recorded inventory details based on the inventory identifier identified at the identifier identifying module 308. The counting and recording module 314 may use the first machine learning model 106A for inventory item tracking to count and record the inventory. The first machine learning model 106A used for the inventory item tracking may be a Kalman algorithm. The data on the number of inventory items and the recorded inventory details may include product information about the one or more inventory items and a note on recorded things (for example, mismatched items) to take action within a period of time.

The inventory data generating module 316 generates inventory data by gathering the empty space data, the matched data, the mismatched data, the data on the number of inventory items, and the recorded inventory details from the database. The inventory data may be generated as a report for user convenience.

The notification module 318 sends at least one of (i) an empty space alert along with the empty space data, if the empty space is determined at the empty space determining module 310, and (ii) a mismatch alert along with the mismatched data, if the pallet identifier is not matched with the corresponding unique rack identifier (checked at the match or mismatch determining module 312) to a user through a user device 108 using the transmitting module 320. The notification module 318 may receive control signals from the processor 302 when the empty space data and the mismatch data are generated for sending the alerts to the user. The at least one empty space alert or the mismatch alert may be given as alarm, voice message, call, SMS, Email, Whatsapp message, push notifications, etc. The transmitting module 320 further communicates the inventory data to a cloud server 110 and the user device 108 through the network 112.

Figure 4B:
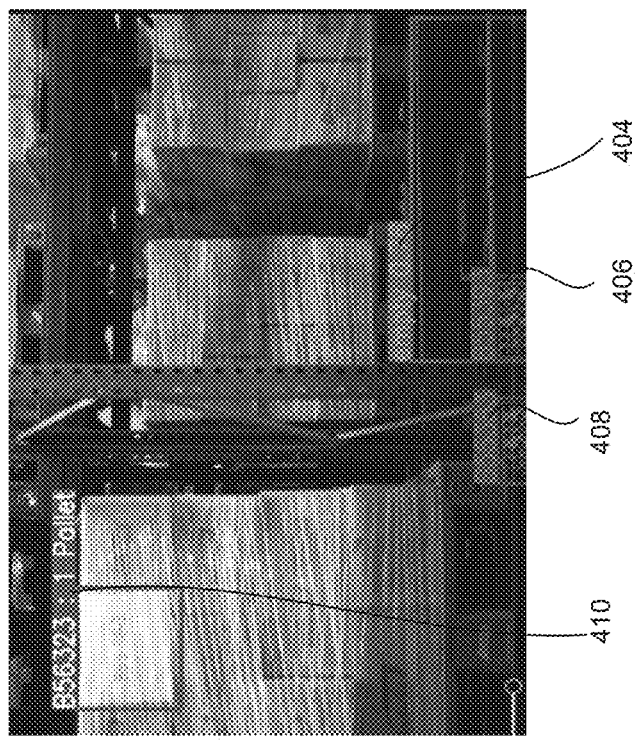
FIGS. 4A and 4B are exemplary views of tracking inventory using an inventory tracking unit of FIG. 1 in a pre-defined space using machine learning models according to some embodiments herein.
Figure 4A:
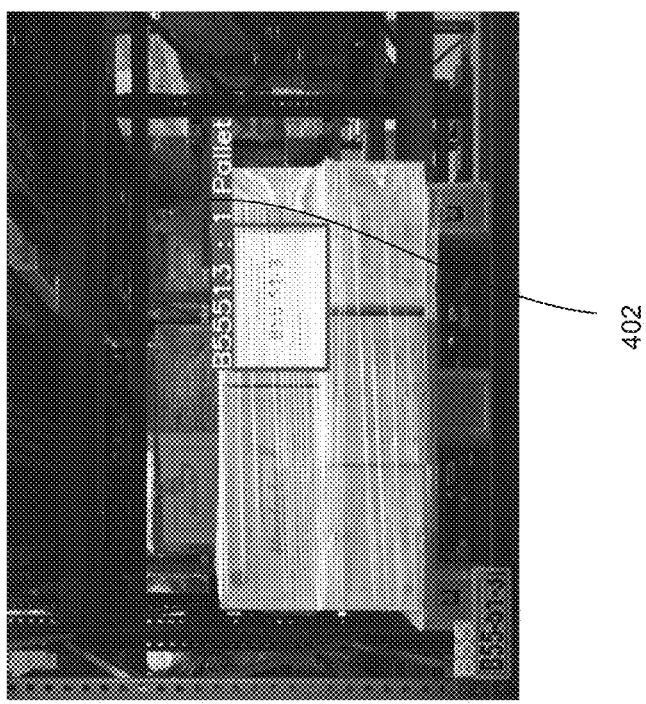

FIGS. 4A and 4B are exemplary views of tracking of inventory using an inventory tracking unit of FIG. 1 in a pre-defined space using machine learning models according to some embodiments herein. The exemplary views include an inventory item with a pallet number B55513:1 as shown at 402 in FIG. 4A. The pallet number B55513:1 is matched with the corresponding unique rack identifier B55513:1. The pallet number at 406 is shown as B55393 and an empty space is detected which is shown at 404. The pallet number at 410 is B56323. The corresponding unique rack identifier which is shown at 408 is B55383. The pallet number which is shown at 410 is not matched with the corresponding unique rack identifier displayed at 408 by the inventory tracking unit 106.

Figure 5:
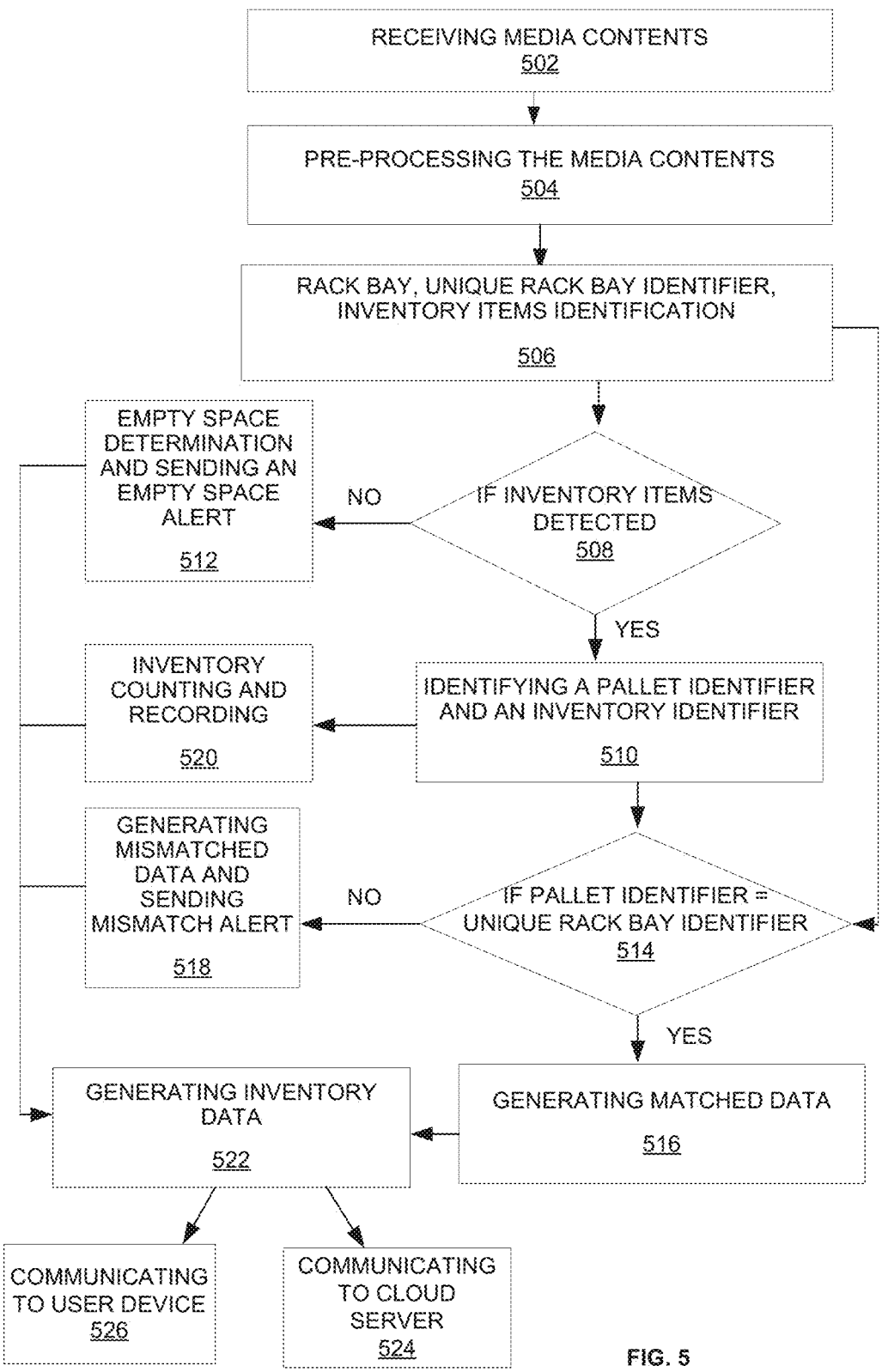
FIG. 5 is a flow diagram that illustrates an inventory tracking method performed by an inventory tracking unit of FIG. 3 according to some embodiments herein.

FIG. 5 is a flow diagram that illustrates an inventory tracking method performed by an inventory tracking unit 106 of FIG. 3 according to some embodiments herein. The inventory tracking unit 106 employs a processor 302 to perform the inventory tracking inside a warehouse 104. At step 502, the processor 302 receives one or more media contents associated with a pre-defined space inside the warehouse 104 in real-time from an unmanned aerial vehicle 102 through a network 112. At step 504, the processor 302 pre-processes the one or more media contents to obtain one or more pre-processed media contents.

At step 506, the processor 302 identifies one or more rack bays, a unique rack bay identifier associated with each rack bay and one or more inventory items on each rack bay in the pre-defined space from the one or more pre-processed media contents using a first machine learning model 106A and a second machine learning model 106B

At step 508, the processor 302 identifies whether the one or more inventory items are detected. At step 510, the processor 302 identifies a pallet identifier and an inventory identifier associated with the one or more inventory items using the second machine learning model 106B, if the one or more inventory items are detected. At step 512, the processor 302 determines an empty space, generates an empty space data, and sends an empty space alert to a user, if the one or more inventory items are not detected.

At step 514, the processor 302 validates whether the pallet identifier associated with the one or more inventory items is matched with the unique rack bay identifier of the corresponding rack bay. At step 516, the processor 302 generates matched data, if the pallet identifier is matched with the corresponding unique rack bay identifier. At step 518, the processor 302 generates mismatched data and sends a mismatch alert, if the pallet identifier is not matched with the corresponding unique rack bay identifier.

At step 520, the processor 302 performs counting of the number of inventory items on each rack bay to generate data on the number of inventory items, and recording the inventory to generate recorded inventory details based on the inventory identifier. At step 522, the processor 302 generates inventory data by gathering the data associated with the empty space, the matched data, the mismatched data, the data on the number of inventory items, and the recorded inventory details.

At step 524, the processor 302 communicates the inventory data to a cloud server 110 through the network 112. At step 526, the processor 302 communicates the inventory data to a user device 108 associated with the user through the network 112.

Figure 6B:
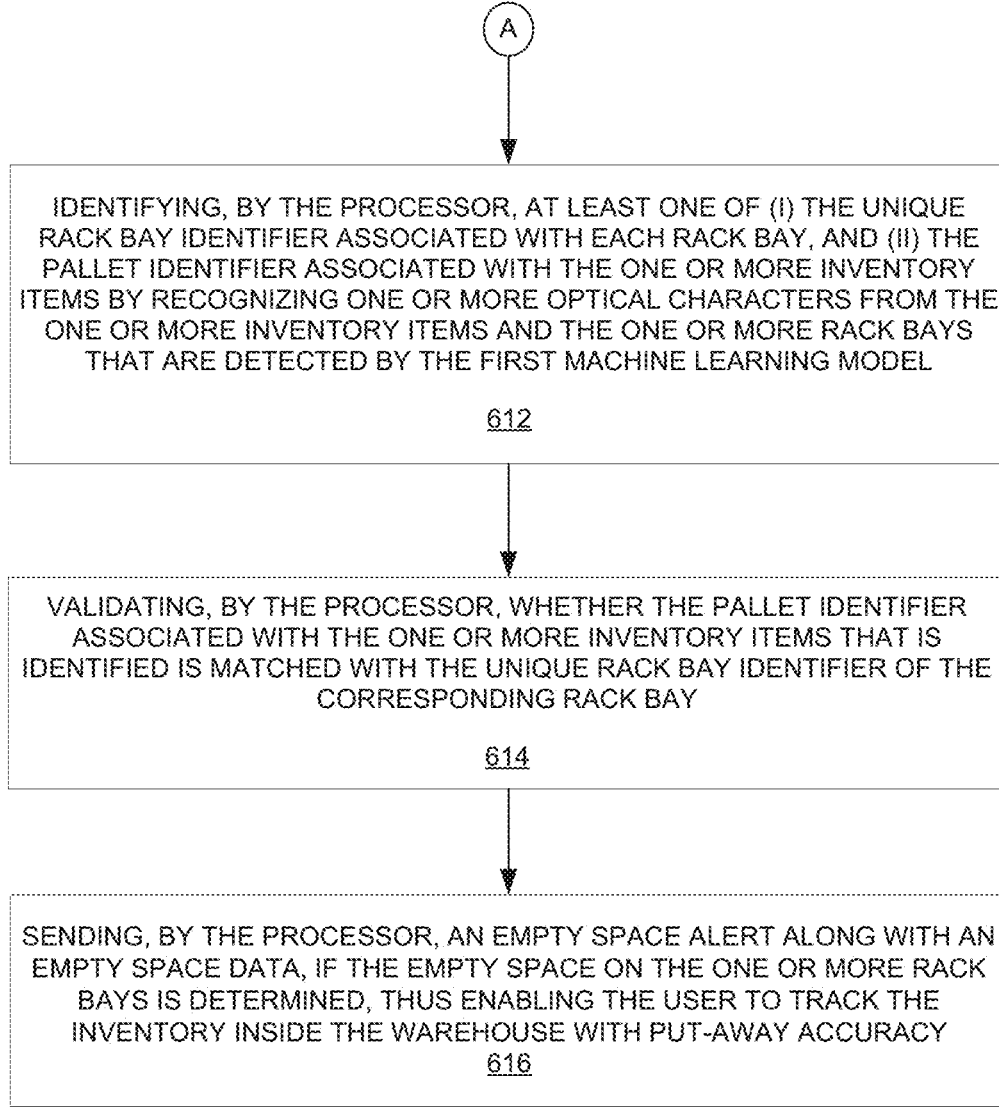

FIGS. 6A and 6B are flow diagrams that illustrates a method of tracking inventory inside a warehouse 104 using a system 100 of FIG. 1 according to some embodiments herein. At step 602, the method includes a step of capturing, using an image capturing device 102A from an unmanned aerial vehicle 102, one or more media contents of a pre-defined space within the warehouse 104. The pre-defined space includes one or more rack bays and each rack bay includes a unique rack bay identifier. Each rack bay is configured to stock one or more inventory items with a pallet identifier that is matched with the unique rack bay identifier of the corresponding rack bay.

At step 604, the method includes a step of receiving, by a processor 302 of an inventory tracking unit 106, the one or more media contents associated with the pre-defined space in real-time from the unmanned aerial vehicle 102 through a network 112 to detect one or more inventory items, and one or more rack bays from the one or more media contents associated with the pre-defined space. At step 606, the method includes a step of training a first machine learning model by correlating historical media contents with historical inventory items, and historical rack bays.

At step 608, the method includes a step of generating, using the first machine learning model, empty space data by determining an empty space on the one or more rack bays between the one or more inventory items when the one or more inventory items is not detected. At step 610, the method includes a step of training a second machine learning model by correlating the historical inventory items, and the historical rack bays that are associated with at least one identifier with historical optical characters of the at least one identifier in the historical media contents.

At step 612, the method includes a step of identifying, by the processor 302, at least one of (i) the unique rack bay identifier associated with each rack bay, and (ii) the pallet identifier associated with the one or more inventory items using a second machine learning model 106B, by recognizing one or more optical characters from the one or more inventory items and the one or more rack bays that are detected by the first machine learning model 106A.

At step 614, the method includes a step of validating, by the processor 302, whether the pallet identifier associated with the one or more inventory items that is identified is matched with the unique rack bay identifier of the corresponding rack bay. At step 616, the method includes a step of sending, by the processor 302, an empty space alert along with the empty space data, if the empty space on the one or more rack bays is determined. Thus, the method enables the user to track the inventory inside the warehouse with the put-away accuracy.

Figure 7:
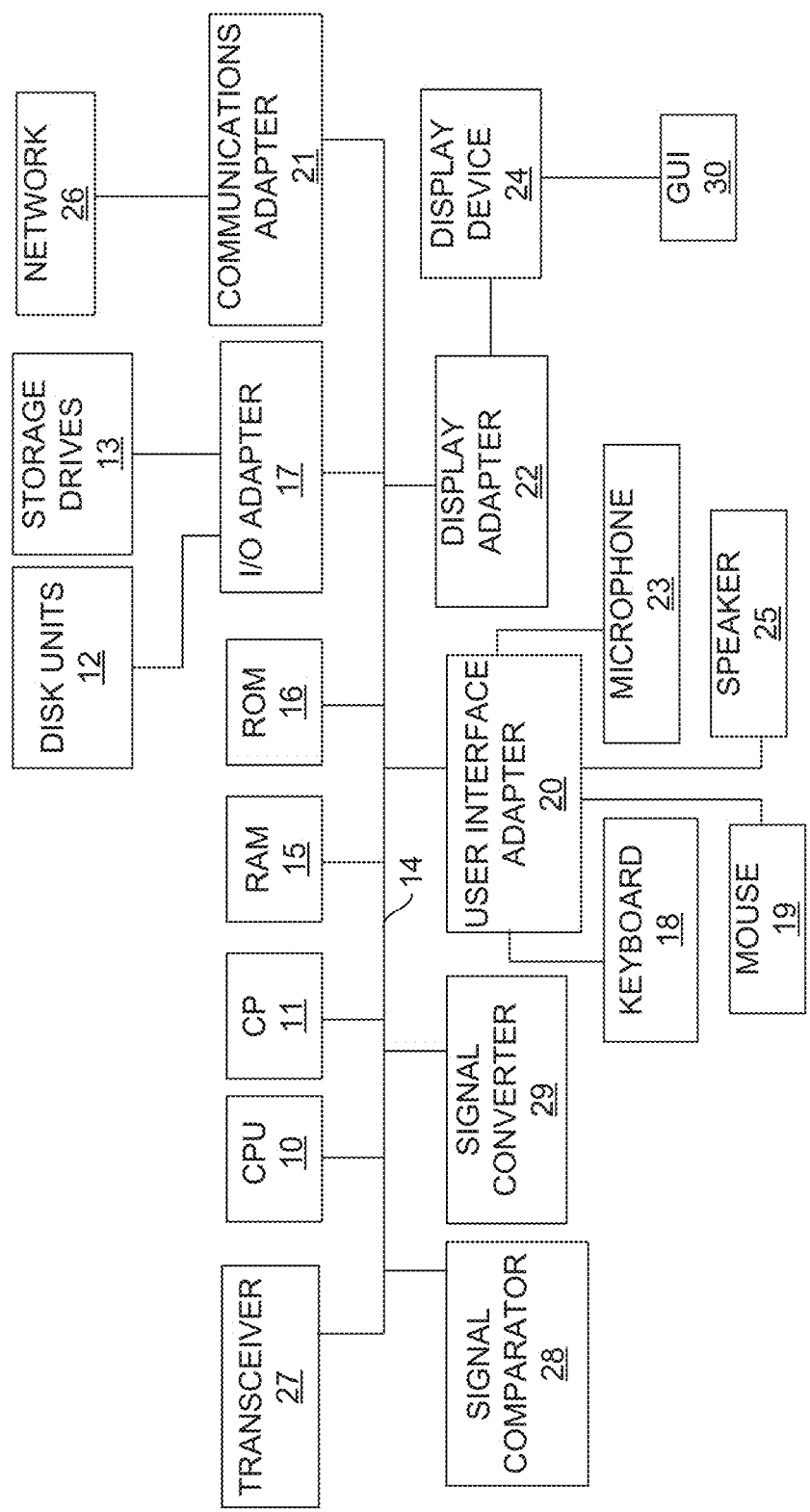
FIG. 7 is a schematic diagram of a computer architecture in accordance with the embodiments herein.

A representative hardware environment for practicing the embodiments herein is depicted in FIG. 7, with reference to FIGS. 1 through 6A & 6B. This schematic drawing illustrates a hardware configuration of an inventory tracking unit 106/computer system/computing device in accordance with the embodiments herein. The system includes at least one processing device CPU 10 that may be interconnected via system bus 15 to various devices such as a random-access memory (RAM) 12, read-only memory (ROM) 16, and an input/output (I/O) adapter 18. The I/O adapter 18 can connect to peripheral devices, such as disk units 58 and program storage devices 50 that are readable by the system. The system can read the inventive instructions on the program storage devices 50 and follow these instructions to execute the methodology of the embodiments herein. The system further includes a user interface adapter 22 that connects a keyboard 28, mouse 50, speaker 52, microphone 55, and/or other user interface devices such as a touch screen device (not shown) to the bus 15 to gather user input. Additionally, a communication adapter 20 connects the bus to a data processing network 52, and a display adapter 25 connects the bus 15 to a display device 26, which provides a graphical user interface (GUI) 56 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for tracking an inventory inside a warehouse with put-away accuracy using machine learning models, wherein the system comprises,
   an unmanned aerial vehicle (UAV) that is configured to capture a plurality of media contents of a pre-defined space within the warehouse when in operation, using an image capturing device, wherein the UAV is pre-programmed to (i) identify a plurality of rack bays, (ii) define a moving path within the warehouse to reach a location of the plurality of rack bays, and (iii) move from one rack bay to another automatically based on a layout of the warehouse and coordinates of the plurality of rack bays; and
   an inventory tracking unit that is communicatively connected with the UAV and the inventory tracking unit comprises,
   a memory that stores a database and a set of instructions, and
   a processor that executes the set of instructions from the memory and is configured to:
   receive, by a first machine learning model, the plurality of media contents associated with the pre-defined space in real-time from the UAV to determine a plurality of inventory items, and the plurality of rack bays associated with the pre-defined space, wherein the pre-defined space comprises the plurality of rack bays and each rack bay comprises a unique rack bay identifier, wherein each rack bay is configured to stock the plurality of inventory items with a pallet identifier that is matched with the unique rack bay identifier of the corresponding rack bay;
   train the first machine learning model by correlating historical media contents with historical inventory items, and historical rack bays, wherein the historical media contents are captured in at least one of different lighting conditions comprising at least one of low light conditions, or bright light conditions, or Infra-red (IR) mode;
   generate, using the first machine learning model, empty space data by determining an empty space on the plurality of rack bays between the plurality of inventory items when the plurality of inventory items is not detected;
   train a second machine learning model by correlating the historical inventory items, and the historical rack bays that are associated with at least one identifier with historical optical characters of the at least one identifier in the historical media contents;
   identify, using the second machine learning model, at least one of (i) the unique rack bay identifier associated with each rack bay, and (ii) the pallet identifier associated with the plurality of inventory items by recognizing one or more optical characters from the plurality of inventory items, and the plurality of rack bays that are detected by the first machine learning model;
   validate whether the pallet identifier associated with the plurality of inventory items that is identified is matched with the unique rack bay identifier of the corresponding rack bay; and
   send an empty space alert along with the empty space data, if the empty space on the plurality of rack bays is determined, thus enabling a user to track the inventory inside the warehouse with the put-away accuracy, wherein the put-away accuracy is a percentage of a total number of the plurality of inventory items put away correctly and a total number of items put away.

2. The system of claim 1, wherein the processor is configured to generate (i) mismatched data, when the pallet identifier is not matched with the corresponding unique rack bay identifier, and (ii) matched data, when the pallet identifier is matched with the corresponding unique rack bay identifier.

3. The system of claim 1, wherein the processor is configured to (i) count the total number of the plurality of inventory items in each rack bay to generate data on the total number of items put away, and (ii) record the inventory to generate recorded inventory details by reading an inventory identifier on the plurality of inventory items using the second machine learning model.

4. The system of claim 2, wherein the processor is configured to send a mismatch alert along with the mismatched data, if the pallet identifier associated with the plurality of inventory items is not matched with the unique rack identifier of the corresponding rack bay to a user device associated with the user.

5. The system of claim 2, wherein the processor is further configured to communicate the empty space data, the mismatched data, the matched data, the total number of the plurality of inventory items and the recorded inventory details to at least one of (i) a cloud server or (ii) the user device through a network.

6. A method of tracking an inventory inside a warehouse with put-away accuracy using machine learning models comprising,
 capturing, using an image capturing device from an unmanned aerial vehicle (UAV), a plurality of media contents of a pre-defined space within the warehouse, wherein the UAV is pre-programmed to (i) identify a plurality of rack bays, (ii) define a moving path within the warehouse to reach a location of the plurality of rack bays, and (iii) move from one rack bay to another automatically based on a layout of the warehouse and coordinates of the plurality of rack bays;
 receiving, by a processor of an inventory tracking unit, the plurality of media contents associated with the pre-defined space in real-time from the UAV to determine a plurality of inventory items, and the plurality of rack bays associated with the pre-defined space, wherein the pre-defined space comprises the plurality of rack bays and each rack bay comprises a unique rack bay identifier, wherein each rack bay is configured to stock the plurality of inventory items with a pallet identifier that is matched with the unique rack bay identifier of the corresponding rack bay;
 training a first machine learning model, by correlating historical media contents with historical inventory items, and historical rack bays, wherein the historical media contents are captured in at least one of different lighting conditions comprising at least one of low light conditions, or bright light conditions, or Infra-red (IR) mode;
 generating, using the first machine learning model, empty space data by determining an empty space on the plurality of rack bays between the plurality of inventory items when the plurality of inventory items is not detected;
 training a second machine learning model by correlating the historical inventory items, and the historical rack bays that are associated with at least one identifier with historical optical characters of the at least one identifier in the historical media contents;
 identifying, using the second machine learning model, at least one of (i) the unique rack bay identifier associated with each rack bay, and (ii) the pallet identifier associated with the plurality of inventory items by recognizing one or more optical characters from the plurality of inventory items, and the plurality of rack bays that are detected by the first machine learning model;
 validating, by the processor, whether the pallet identifier associated with the plurality of inventory items that is identified is matched with the unique rack bay identifier of the corresponding rack bay; and
 sending, by the processor, an empty space alert along with the empty space data, if the empty space on the plurality of rack bays is determined, thus enabling a user to track the inventory inside the warehouse with the put-away accuracy, wherein the put-away accuracy is a percentage of a total number of inventory items put away correctly and a total number of items put away.

7. The method of claim 6, wherein the method comprising (i) counting the total number of the plurality of inventory items in each rack bay to generate data on the total number of items, and (ii) recording the inventory to generate recorded inventory details by the processor when reading an inventory identifier on the plurality of inventory items using the second machine learning model.

8. The method of claim 6, wherein the method comprising communicating, by the processor, (i) the empty space data, (ii) mismatched data that is generated, if the pallet identifier associated with the plurality of inventory items is not matched, (iii) matched data that is generated, if the pallet identifier associated with the plurality of inventory items is matched, (iv) the data on the total number of the plurality of inventory items and (v) the recorded inventory details to at least one of (i) a cloud server or (ii) a user device through a network.

9. A non-transitory computer-readable storage medium storing a sequence of instructions, which when executed by a processor, causes performing a method of tracking an inventory inside a warehouse with put-away accuracy using machine learning models comprising, capturing, using an image capturing device from an unmanned aerial vehicle (UAV), a plurality of media contents of a pre-defined space within the warehouse, wherein the UAV is pre-programmed to (i) identify a plurality of rack bays, (ii) define a moving path within the warehouse to reach a location of the plurality of rack bays, and (iii) move from one rack bay to another automatically based on a layout of the warehouse and coordinates of the plurality of rack bays;
 receiving, by a processor of an inventory tracking unit, the plurality of media contents associated with the pre-defined space in real-time from the UAV to determine a plurality of inventory items, and the plurality of rack bays associated with the pre-defined space, wherein the pre-defined space comprises the plurality of rack bays and each rack bay comprises a unique rack bay identifier, wherein each rack bay is configured to stock the plurality of inventory items with a pallet identifier that is matched with the unique rack bay identifier of the corresponding rack bay;
 training a first machine learning model, by correlating historical media contents with historical inventory items, and historical rack bays, wherein the historical media contents are captured in at least one of different lighting conditions comprising at least one of low light conditions, or bright light conditions, or Infra-red (IR) mode;
 generating, using the first machine learning model, empty space data by determining an empty space on the plurality of rack bays between the plurality of inventory items when the plurality of inventory items is not detected;
 training a second machine learning model by correlating the historical inventory items, and the historical rack bays that are associated with at least one identifier with historical optical characters of the at least one identifier in the historical media contents;
 identifying, using the second machine learning model, at least one of (i) the unique rack bay identifier associated with each rack bay, and (ii) the pallet identifier associated with the plurality of inventory items by recognizing one or more optical characters from the plurality of inventory items, and the plurality of rack bays that are detected by the first machine learning model;
 validating, by the processor, whether the pallet identifier associated with the plurality of inventory items that is identified is matched with the unique rack bay identifier of the corresponding rack bay; and sending, by the processor, an empty space alert along with the empty space data, if the empty space on the plurality of rack bays is determined, thus enabling a user to track the inventory inside the warehouse with the put-away accuracy, wherein the put-away accuracy is a percentage of a total number of inventory items put away correctly and a total number of items put away.

10. The non-transitory computer-readable storage medium storing a sequence of instructions of claim 9, wherein the method comprising (i) counting the total number of the plurality of inventory items in each rack bay to generate data on the total number of items, and (ii) recording the inventory to generate recorded inventory details by the processor when reading an inventory identifier on the plurality of inventory items using the second machine learning model.

11. The non-transitory computer-readable storage medium storing a sequence of instructions of claim 9, wherein the method comprising communicating, by the processor, (i) the empty space data, (ii) mismatched data that is generated, if the pallet identifier associated with the plurality of inventory items is not matched, (iii) matched data that is generated, if the pallet identifier associated with the plurality of inventory items is matched, (iv) the data on the total number of the plurality of inventory items and (v) the recorded inventory details to at least one of (i) a cloud server or (ii) a user device through a network.

\* \* \* \* \*